United States Patent
Corcoran et al.

(10) Patent No.: US 9,998,675 B2
(45) Date of Patent: *Jun. 12, 2018

(54) REARVIEW IMAGING SYSTEM FOR VEHICLE

(71) Applicant: FotoNation Limited, Galway (IE)

(72) Inventors: Peter Corcoran, Claregalway (IE); Petronel Bigioi, Galway (IE); Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 7 days.

This patent is subject to a terminal disclaimer.

(21) Appl. No.: 15/006,050

(22) Filed: Jan. 25, 2016

(65) Prior Publication Data
US 2016/0212354 A1    Jul. 21, 2016

Related U.S. Application Data

(63) Continuation of application No. 13/596,044, filed on Aug. 27, 2012, now Pat. No. 9,242,602.

(51) Int. Cl.
| | |
|---|---|
| *H04N 7/18* | (2006.01) |
| *H04N 5/232* | (2006.01) |
| *B60R 1/00* | (2006.01) |
| *H04N 5/247* | (2006.01) |
| *H04N 5/77* | (2006.01) |
| *B60R 1/12* | (2006.01) |

(52) U.S. Cl.
CPC ......... *H04N 5/23296* (2013.01); *B60R 1/00* (2013.01); *H04N 5/247* (2013.01); *H04N 5/77* (2013.01); *H04N 7/181* (2013.01); *B60R 2001/1253* (2013.01); *B60R 2300/105* (2013.01); *B60R 2300/303* (2013.01); *B60R 2300/70* (2013.01); *B60R 2300/802* (2013.01); *B60R 2300/8066* (2013.01)

(58) Field of Classification Search
CPC .... H04N 5/23296; H04N 5/247; H04N 7/181; B60R 1/00; B60R 2001/1253; B60R 2300/105; B60R 2300/303; B60R 2300/70; B60R 2300/802; B60R 2300/8066
USPC ........................................................ 348/148
See application file for complete search history.

(56) References Cited

U.S. PATENT DOCUMENTS

| | | | |
|---|---|---|---|
| 9,242,602 B2* | 1/2016 | Corcoran | B60R 1/00 |
| 2010/0201816 A1* | 8/2010 | Lee | B60R 1/12 348/148 |
| 2011/0115615 A1* | 5/2011 | Luo | B60R 1/00 340/436 |
| 2012/0154590 A1* | 6/2012 | Watanabe | B60R 1/00 348/148 |
| 2012/0275725 A1* | 11/2012 | Kelly | G06T 3/0018 382/300 |

* cited by examiner

*Primary Examiner* — Michael Lee

(57) ABSTRACT

A rearview imaging system for a vehicle includes at least one video camera mounted at the rear of the vehicle for providing a wide angle horizontal field of view (FoV) rearwardly of the vehicle, and a display device in the vehicle at a position viewable by the driver. A video processor subdivides the camera FoV into three horizontally disposed sub-FOVs and displaying said sub-FoVs on visually separated side-by-side regions of the display device screen. The horizontal position and/or extent of at least one sub-FoV is variable as a function of the motion of the vehicle.

16 Claims, 8 Drawing Sheets

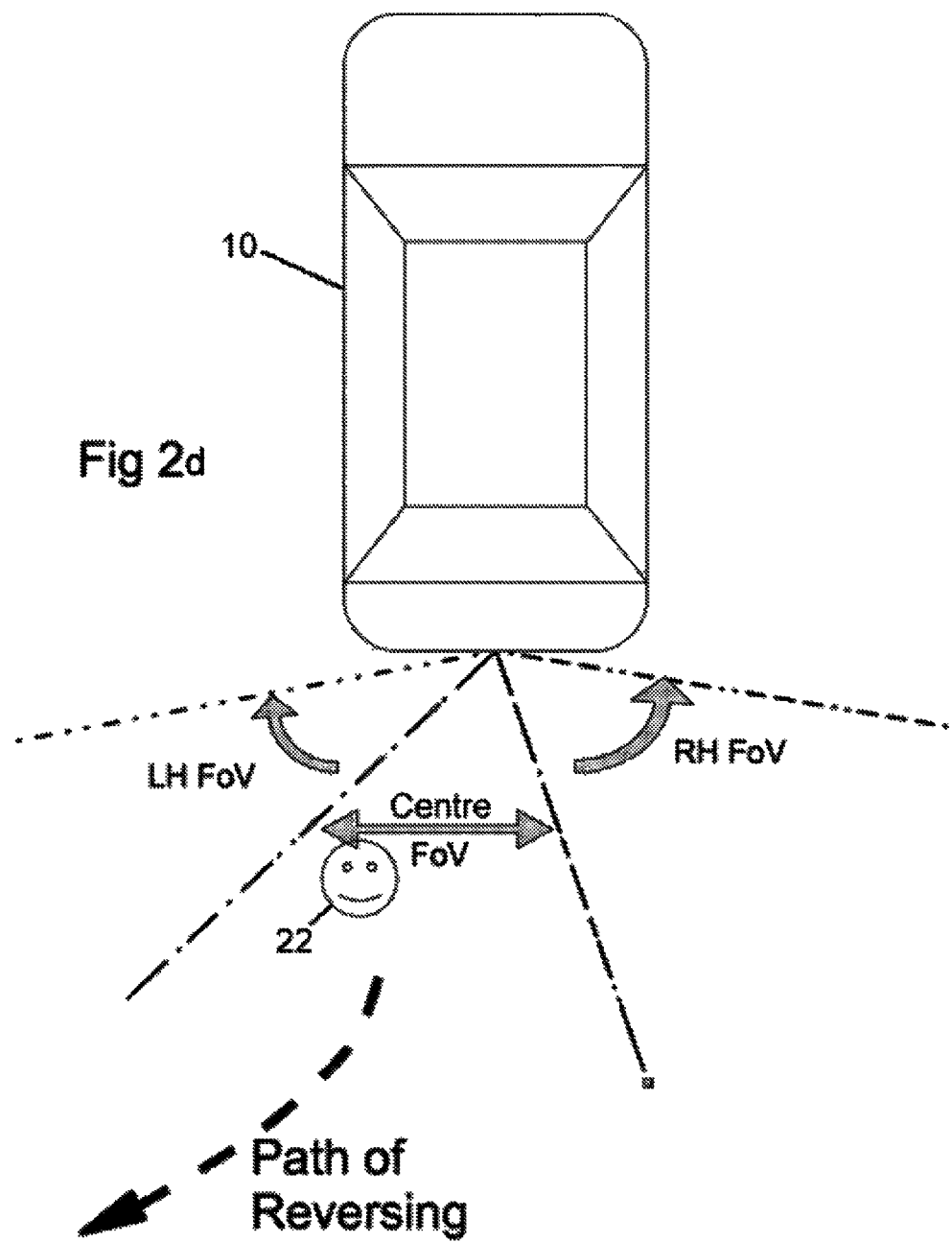

REARVIEW IMAGING SYSTEM FOR VEHICLE

RELATED APPLICATIONS

This application relates to U.S. application Ser. No. 13/541,650 filed Jul. 3, 2012, which is incorporated herein by reference.

FIELD

This invention relates to a rearview imaging system for automobiles and other vehicles.

BACKGROUND

U.S. Pat. No. 4,214,266, incorporated by reference, describes a visual aid system for assisting an operator while manoeuvring a vehicle. The system described by the '266 patent includes a closed circuit video system including a distance measuring apparatus. The system enables the operator to see behind the vehicle and, through the use of the distance indicating apparatus, the operator can tell how far the rear of the vehicle is from objects seen via the video system.

U.S. Pat. No. 5,670,935, incorporated by reference, describes a rearview vision system for a vehicle that includes at least one image capture device directed rearwardly with respect to the direction of travel of the vehicle. A display system, e.g., including any of the displays 20, 20', 20", or 20''' schematically illustrated in the '935 patent, provides an image synthesized from output of the image captive device. The display system described at the '935 patent may be contiguous with the forward field of view of the vehicle driver at a focal length that is forward of the vehicle passenger compartment. A plurality of image capture devices may be provided as set forth in the '935 patent and the display system may display a unitary image synthesized from outputs of the image captive devices approximating a rearward-facing view from a single location, such as forward of the vehicle.

U.S. Pat. No. 6,559,761, incorporated by reference, discloses an overhead-view display system for a vehicle. The display system disclosed in the '761 patent includes a reference vehicle indicator within an overhead field of view and at least three field of view display segments. Each display segment represents a physical region adjacent the reference vehicle and includes a first indicator adapted to display the existence of another vehicle within the region and the relative distance between the reference vehicle and the other vehicle. In another embodiment disclosed in the '761 patent, each field of view display segment includes a second indicator adapted to represent a direction of change of relative distance between the reference vehicle and the other vehicle, and possibly the vehicle types. Thus, the display system disclosed in the '761 patent communicates information on the vehicle's operating environment to the vehicle operator while attempting to limit a degree of driver distraction. It is desired to have a rearview imaging system that reduces driver distraction further.

U.S. Pat. No. 7,139,412, incorporated by reference, describes a means to create a synthesized "bird's-eye view" of an area surrounding a vehicle. Multiple cameras (CAM1) to (CAM8) are described in the '412 patent for shooting the periphery of a local vehicle as being mounted on the vehicle. When obtained, camera images are synthesized and displayed on a screen of a display device. Pixel data for camera images are described in the '412 patent as constituting a synthesized image that is compensated for, so that differences in the pixel data for adjacent camera images is reduced. In one example described in the '412 patent, the pixel data are corrected so that their values equal the average values of the pixel data for adjacent camera images. It is desired to have a more informative yet easily viewable rearview image that is provided on a display for vehicle user to view).

U.S. Pat. No. 7,881,496, incorporated by reference, describes a vision system for a vehicle that includes an imaging device having an imaging sensor, a camera microcontroller, a display device having a display element, a display microcontroller, and at least one user input selectively actuable by a user. The imaging device communicates an image signal to the display device via a communication link. The display microcontroller affects the image signal in response to the at least one user input. The camera microcontroller monitors the image signal on the communication link and adjusts a function of the imaging device in response to a detection of the affected image signal. The vision system described in the '496 patent may adjust a display or sensor of the system in conjunction with a distance detecting system. It is desired to have an improved rearview imaging system.

U.S. Pat. No. 8,150,210 describes an image synthesis system for a vehicle to provide the driver with a downward-facing image of the car's 360 degree surrounding view. The system includes: a first camera, which is used to shoot a first image of the periphery of the vehicle; a second camera, which is used to shoot a second image of the periphery of the vehicle, wherein the second image and the first image have an overlap region. An image processing device disclosed in the '210 patent includes a defining component and a synthesis component, which is used to synthesize the first image and the second image and output a third image. A display device is used to display the third image. It is desired to have a system that manages object synthesis in overlapping regions so that. Objects are not distorted.

U.S. Pat. No. 6,734,896 and U.S. Pat. No. 7,714,887, which are incorporated by reference, describe an image processor which is programmed to generate a natural synthesized image from camera images taken with a plurality of cameras capturing the surroundings of a vehicle. A parameter storage section stores a plurality of image synthesis parameter groups representing the correspondence between the camera images and the synthesized in and having different spatial or temporal resolution relations. A parameter selection section selects the image synthesis parameter group according to the output of a vehicle motion detection section for detecting the motion of the vehicle such as the driving speed and direction. An image synthesis section generates the synthesized image from the camera images according to the selected image synthesis parameter group.

BRIEF DESCRIPTION OF THE DRAWINGS

Embodiments of the invention will now be described, by way of example, with reference to the accompanying drawings, in which:

FIGS. 2A to 2D illustrate an overall wide angle field of view (WFoV) of a camera is partitioned by a video processor into three subsidiary FoVs when a vehicle is reversing in accordance with certain embodiments.

DETAILED DESCRIPTIONS OF THE EMBODIMENTS

According to certain embodiments, a rearview imaging system for a vehicle includes at least one video camera mounted at the rear of the vehicle for providing a wide angle horizontal field of view (FoV) rearwardly of the vehicle. A display device is provided in the vehicle at a position viewable by the driver for viewing images provided by the at least one video camera. A video processor subdivides the camera FoV into multiple sub-FOVs, e.g., three horizontally disposed sub-FOVs. The video processor generates images that are displayed including the sub-FoVs displayed on visually separated side-by-side regions of the display device screen, wherein the horizontal position and/or extent of at least one sub-FoV is variable as a function of the motion of the vehicle.

The camera FoV may be divided into left-hand (LH), right hand (RH) and centre subsidiary FoVs, e.g., in the example embodiment wherein the camera FoV is subdivided into three sub-FOVs.

In certain embodiments when the vehicle is reversing and turning in a particular direction, a boundary between the centre FoV and one or more subsidiary FoVs on the side of the vehicle in which the vehicle is reversing is shifted towards that side of the vehicle. In this example, a region of a display screen displaying the centre FoV may be elongated at the expense of at least one other region of the display screen, when the vehicle is reversing and turning in the aforesaid particular direction.

One or more subsidiary fields of view may narrow in certain embodiments when the vehicle moves forward. The subsidiary fields of view may become progressively narrower as the vehicle speed increases.

In certain embodiments, the benefits of a combined system that includes a wide-angle viewing system for parking or reversing operations and a dynamic field of view system that adjusts FoV as the vehicle slows in rearward motion, stops and/or begins forward motion. A two- or three-(or more) display format is provided in certain embodiments that may mimic a conventional left-, right-, and rear-view mirrors when in forward motion. A wide field of view, e.g., a panoramic view of 90° or 120° or 150° or 180°, that includes the rear and at least part of one or both sides of the vehicle, including one or more blind-spots, are advantageously provided on an easily viewable display for a driver to utilize when reversing.

Figure 1A:
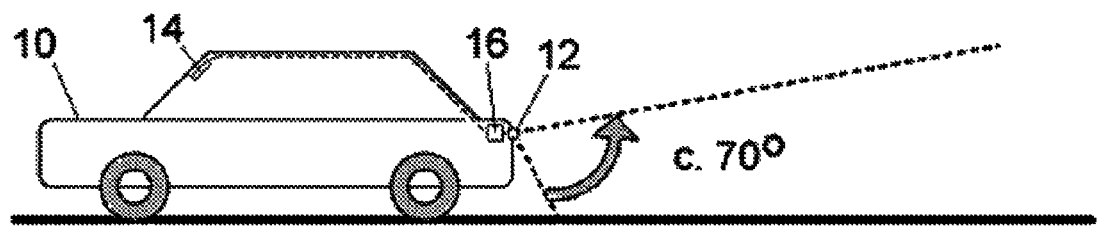
FIGS. 1A and 1B illustrate schematic side and top views respectively of an automobile in accordance with certain embodiments.
Figure 1B:
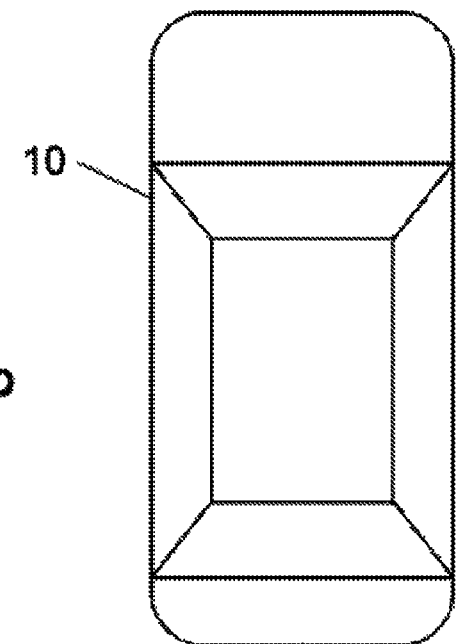

FIGS. 1A and 1B are schematic side and top views, respectively, of an automobile 10 schematically illustrating vertical and horizontal field of view (FoV) in accordance with certain embodiments. The rearview imaging system in this embodiment includes a rearward facing wide-angle field of view (WFoV) video camera 12 that is mounted outside the vehicle at the rear for imaging the view behind the vehicle. The system of this embodiment may include only a single WFoV camera 12 or two or more cameras may be used (see, e.g., FIGS. 4, 5 and 6 and description of two and three (or more) camera embodiments below). The camera 12 may be mounted in a compartment inside the vehicle housing, trunk housing, bumper housing, license plate housing, brakelight or turning signal housing or other compartment that has an aperture sufficient for capturing images with the desired field or fields of view. A camera or camera module may be used that has features such as shock-absorption, a waterproof seal, zoom and/or auto-focus, electromagnetic interference (EMI) shielding, or having one or more or several further features as may be described at any of U.S. patent application Ser. No. 13/571,393, Ser. No. 13/571,395, Ser. No. 13/571,397, Ser. No. 13/571,405, Ser. No. 13/445, 857, 61/609,293, and 61/643,331, and U.S. Pat. No. RE42, 898, and US published patent applications nos. 20120063761, 20110221936, 20110216158, 20090115885 and 20090225171, which are assigned to the same assignee and are hereby incorporated by reference. Other cameras and camera module embodiments and embodiments of features and components of camera modules that may be included with alternative embodiments are described at U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296,717, 2008/0099907, 2008/0099900, 2008/0029879, 2007/0190747, 2007/0190691, 2007/0145564, 2007/0:138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US2012/024018 and PCT/US2012/025758, which are all hereby incorporated by reference.

Referring again to the example illustrations of FIGS. 1A and 1B, a widescreen display device 14 is mounted inside the vehicle at the front for viewing by the driver. A video processor 16 is included for processing the video signal from the camera 12 for viewing at the display device 14, and is described in detail below. The camera 12, video processor 16 and display 14 are illustrated in example configurations in FIG. 1a and may be mounted and connected in various ways. For example, wired or wireless signals may be transmitted and received between the components 12, 14 and 16, and two cameras 12 may be disposed to provide 3D images and distance information may be provided by a technique described at any of US published applications nos. 2012/0007940 A1, 2012/0200725 A1, 2012/0120283 A1, 2012/0075492 A1, and/or 2007/0269108 and/or US patent applications serial numbers PCT/US2012/025758, U.S. Ser. No. 13/077,891, and/or U.S. Pat. Nos. 7,469,071, 7,692,696, 7,606,417, and/or 7,868,922, which are assigned to the same assignee and incorporated by reference.

FIG. 1A illustrates an example of a side-view when the vertical FoV of the camera is not selected to extend significantly above the horizon; however, as the FoV can be adjusted digitally by an image processing section within the video processor, a camera with selected FoV, including up to full hemisphere view, can be used, and even more than 180° FoV may be used in certain embodiments, e.g, using multiple cameras and/or one or more mirrors. Although the video processor 16 is shown in FIG. 1A as a separate unit, some or all of its functions can be contained within the camera and/or display unit or distributed between the two, and multiple processor components may combine to form video processor 16, such as an image signal processor or ISP, a central processing unit or CPU, and/or a hardware acceleration component such as described at US published applications nos. 2012/0008002 A1, 2011/0134287A1, 2011/0115928 A1 and/or 2012/0106790 A1, which are all incorporated by reference.

FIG. 1A illustrates an exemplary vertical FoV of about 70 degrees and FIG. 1B illustrates a horizontal FoV which may be as close to 180 degrees as possible, and not less than 135 degrees in multiple embodiments. In certain embodiments, the camera is mounted higher such as on a taller vehicle or located towards the roof of the vehicle, and a different, typically wider, vertical FoV is provided accordingly.

The camera FoV, in several embodiments and configurations of camera positions and number of one or more cameras and differently directed cameras and fields of view in combination, allows the region immediately behind the vehicle and one or both blind spots on the sides behind the driver to be imaged.

Figure 2A:
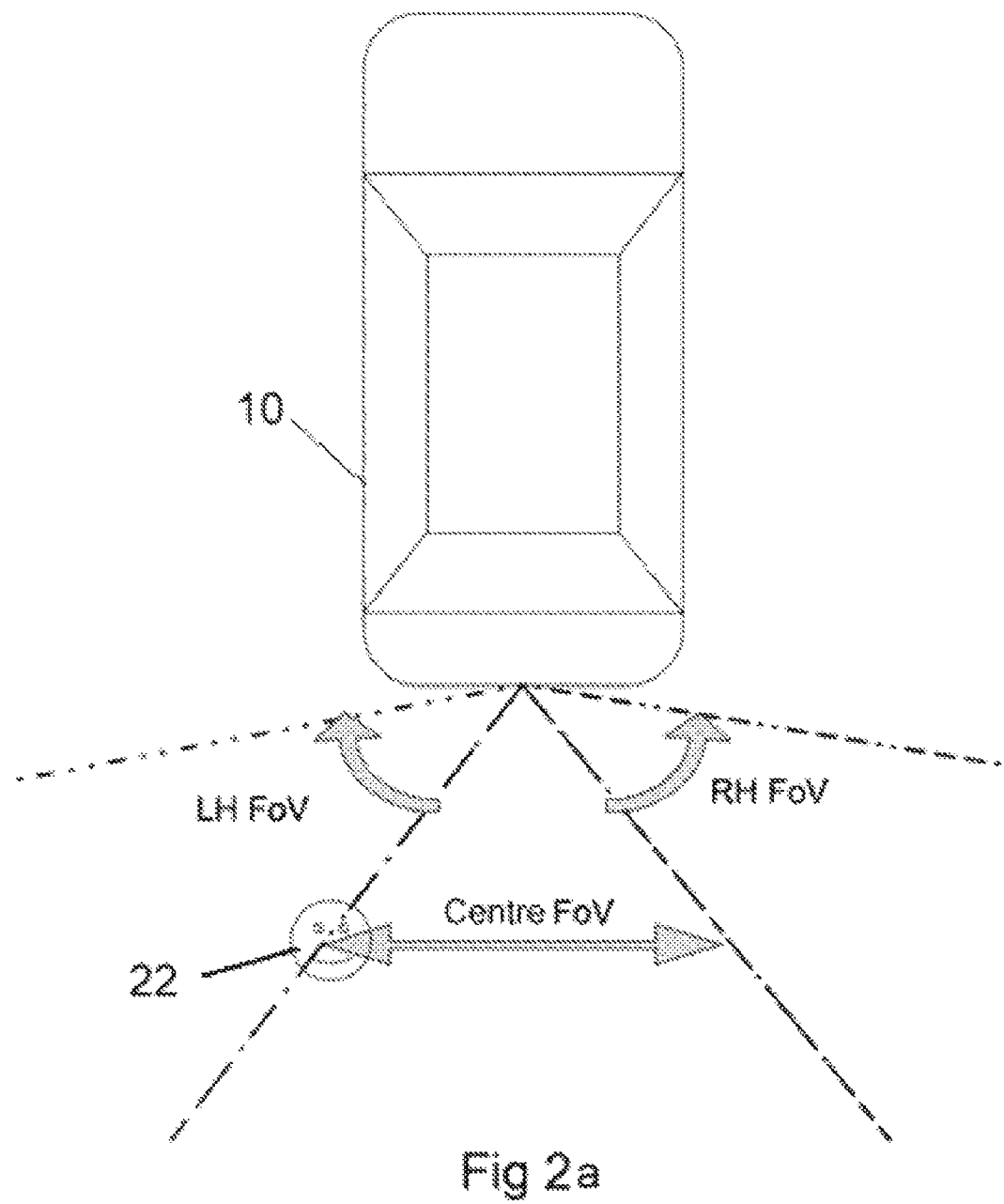

FIG. 2A illustrates how the display 14 for the overall wide angle FoV of the camera 12 in accordance with certain embodiments is partitioned by the video processor 16 into three subsidiary FoVs, in this example, when a vehicle is reversing, including a Left-Hand FoV, a Right-Hand FoV and a Centre FoV.

When reversing, the vertical FoV, which can be dynamically adjusted in certain embodiments, includes the region immediately behind the vehicle, as well as in blind-spots to the sides and behind the driver, as shown in FIG. 1A. When widening or narrowing a subsidiary FoV, for example, is described with reference to FIG. 3B, or changing the boundary between subsidiary FoVs is described with reference to FIG. 2D, these are done with the assistance of the video processor 16 in certain embodiments, while the physical field or fields of view of the camera (or cameras, in the later embodiments) does not or do not change. In alterative embodiments, the field of view of one or more cameras may be adjusted.

The images derived from the three subsidiary FoVs are transmitted to and displayed side-by-side on the widescreen display device 14 which may include a virtual 2- or 3-screen (or more) display implemented on a widescreen display unit. Separation between the three image fields may be as shown with software-generated vertical bars 20 on the display clearly demarcating each image from its neighbour(s).

Figure 2B:
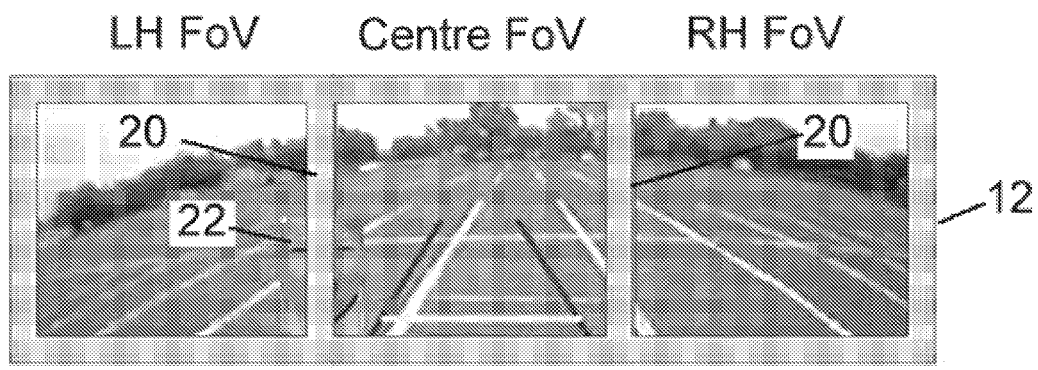

In FIG. 2A, a child 22 is represented in the blind-spot of the vehicle, and overlapping the Left-hand FoV and the Centre FoV. A first point is that if the video representation were transferred directly to the display device 14, the child would appear across the right-hand bar 20 which is counter-intuitive for the driver because the child is actually on the left-hand side of the vehicle. Thus the entire video display is in certain embodiments left-right inverted to obtain the correct intuitive display on the screen of the display device, as illustrated in FIG. 2B.

Figure 2C:
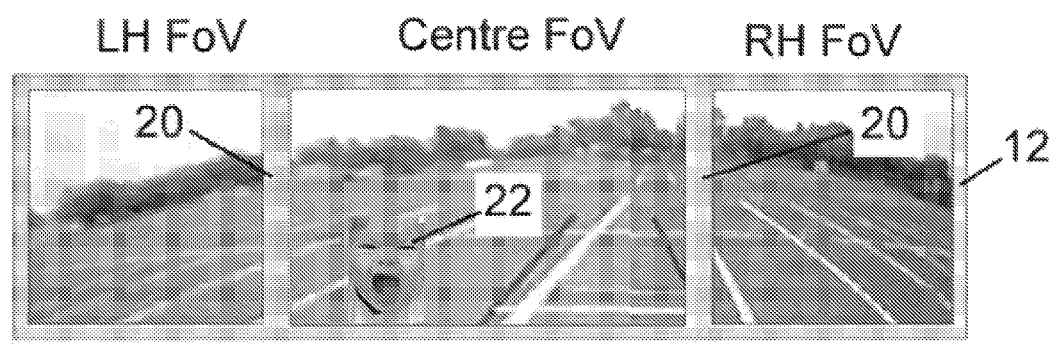

A second point with regard to FIG. 2A is that, with its image straddling the bar 20, the child is less likely to be seen than if ifs image fell wholly within the sub-FoV of one of the images. Therefore, when the vehicle is actually reversing (as opposed to being stationary), the Centre FoV is rotated in certain embodiments in the direction of reversing, so that a foreground object offset in the direction of reversing is brought within the central image. This is illustrated in FIG. 2d, where the vehicle is reversing towards the left and the center FoV has rotated towards the left; such that the child is brought within the center FoV image as illustrated at FIG. 2C. In certain embodiments, the angle of the LH FoV has decreased while that of the RH FoV has increased by the same amount. Alternatively, however, just the left hand boundary of the Centre FoV could rotate to the left, leaving the right hand boundary where it is. In certain embodiments, while the LH FoV angle would decrease, the RH FoV angle would stay the same.

In other embodiments, the system is configured to rotate the rear FoV in the manner shown in FIG. 2D even when the vehicle is stationary. This can be achieved by foreground/background analysis to detect foreground objects of interest, and when such is found the center FoV, or at least the boundary of the center FoV on the relevant side of the vehicle, is rotated to include the object within the center FoV.

Also, the widths of the three subsidiary FoV images—Left Hand FoV, Centre FoV and Right Hand FoV—may be adapted dynamically based on the vehicle motion. Thus in certain embodiments, when the driver begins to steer to the left while reversing, the view in this direction is deemed to become more important and thus the representation of this section of the view may be enlarged and/or elongated on the display unit while that of the Rear-FoV or the Right-Hand FoV, or both, may be reduced accordingly. This situation is also illustrated in FIG. 2C.

Figure 3A:
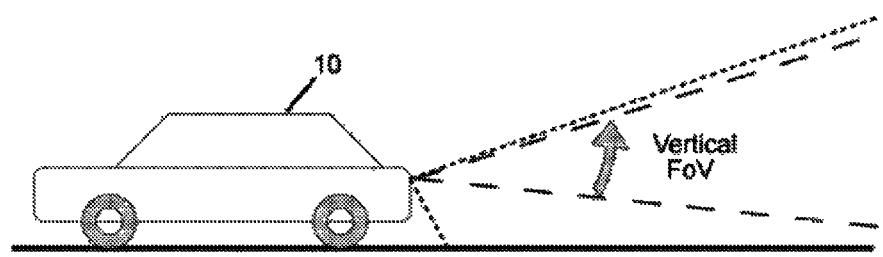
FIGS. 3A and 3B illustrate schematic side and top views respectively of an automobile equipped with rearview imaging in accordance with certain embodiments, wherein horizontal and vertical fields of view (FoVs) narrow on a display when the vehicle transitions into forward motion.
Figure 3B:
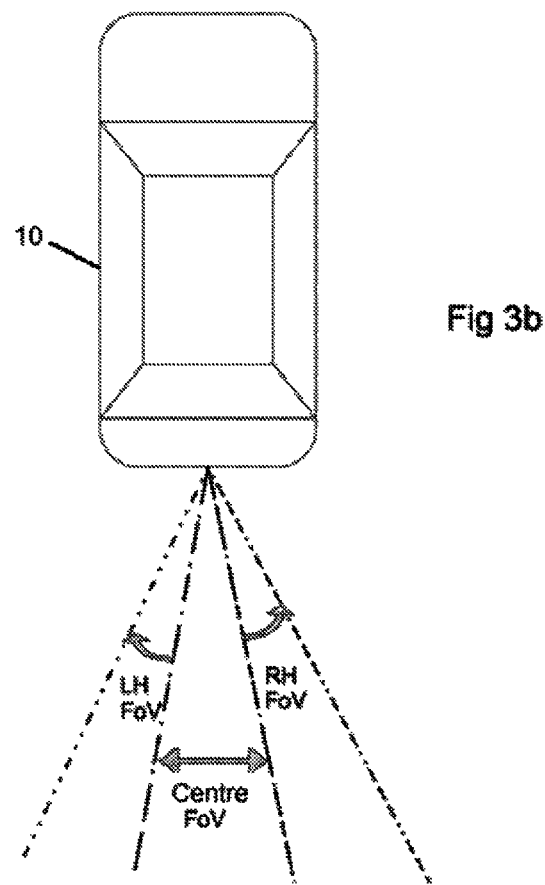

FIGS. 3A and 3B are schematic side and top views respectively of an automobile 10 illustrating horizontal and vertical FoVs that may in certain embodiments narrow when the vehicle transitions from rearward motion or from a stop into forward motion and/or may be widened when a vehicle transitions from forward motion or from a stop to reverse direction.

The rear-view imaging system continues to monitor the rear of the vehicle when a transition to forward motion is being made, but as it is deemed to be less important now to show a very wide panoramic display of the rear and side regions of the vehicle, the angular extent of the two or three or more horizontal sub-FoVs (e.g., the RH FoV, LH FoV and Centre FoV) are narrowed compared to reversing (again, such narrowing is accomplished in certain embodiments by selection of the desired FoVs by the video processor and not by changing the physical FoVs the camera; although in alternative embodiments the camera FoV may be adjusted). As the speed of the vehicle increases in certain embodiments, the angular extent of the horizontal FoVs becomes progressively narrower until eventually, at highway speeds for example, the LH and RH FoV will correspond approximately to the field of view of wing mirrors while the Centre FoV corresponds approximately to the field of view of a rear-view mirror (see FIG. 3B). In addition to the narrowing of the horizontal RN, the vertical FoV may also narrow in certain embodiments as it is deemed to be less important now to image and display the blind-spot immediately to the rear of the vehicle (FIG. 3A).

A particularly useful processor 16 for implementing certain embodiments is described in U.S. application Ser. No. 13/541,650 filed 3 Jul. 2012 which is incorporated herein by reference. Here, the processor divides the display 14 into a number of Local Grids. Each grid corresponds to a respective Left-Hand, Right-Hand and Centre FoV, in the three sub-FOV embodiments, and each sub-FoV corresponds to a region of the image stream being acquired from the camera 12. The image stream provided by the camera 12 is stored in memory and the region of image information for each grid is retrieved in turn by a correction engine component of the processor across a system bus. The correction engine subjects the image information for each local grid to a combination of transformations comprising a local Affine and global transformation before writing the corrected information back to system memory from where it is retrieved for display. Each of these transformations can, for example, in certain embodiments compensate for physical lens distortion (Global transform), simulate lens distortion (Local transform) or can for example, implement the mirroring of the display vis-à-vis the camera view (Affine transform). The correction engine however, by defining the individual transformations separately and applying the combination of transformations in a single step for a local grid can thus effectively simulate wing mirror fields of view at the sides of the display with a separate adjusting rear view display at the centre. Furthermore, the processor can also readily adjust the size of each grid in response to movement of the vehicle as described above. In certain embodiments, features and components may be as described at US published patent applications nos. US20110216156A1, US20120133746A1, US20110141227A1, US20110141229A1, and/or US20120019613A1, and U.S. patent application Ser. No. 13/077,891, Ser. No. 13/084,340 and/or Ser. No. 13/078,971, which are all incorporated by reference.

Figure 4:
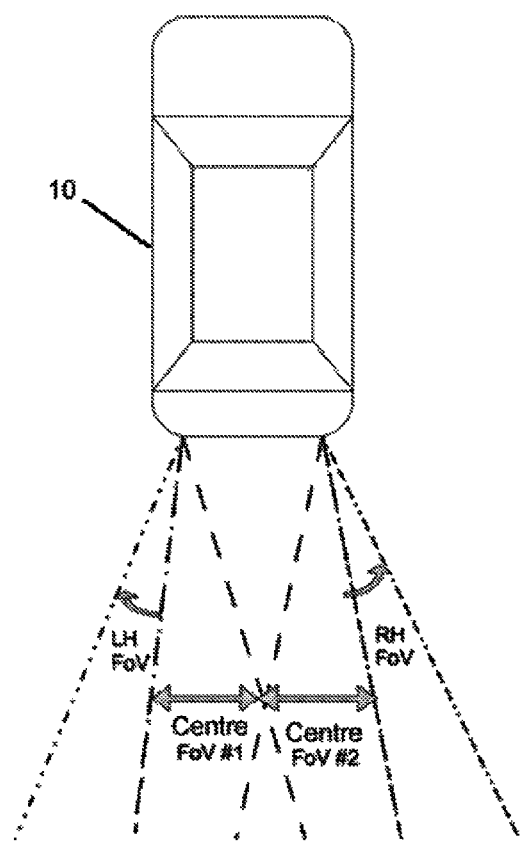
FIGS. 4 to 6 schematically illustrate embodiments that include two or more cameras.

FIG. 4 schematically illustrates another embodiment involving two WFoV cameras with overlapping fields of view. As shown, in this case the left hand part of the left hand camera FoV provides the LH FoV for the display device 14, the right hand part of the right hand camera FoV provides the RH RN for the display device, and the Center FoV for the display device is derived from the portions Center FoV #1 and Center FoV #2 of the two cameras. These FoVs are defined by the video processor 16. Some additional post processing by the video processor is involved in certain embodiments to combine the two Center FoVs from two independent cameras. This configuration of two or more cameras allows some scope to image and analyse behind objects blocking the full Centre FoV of a single camera. This alternative embodiment also provides more truthful FoVs corresponding to wing-mirror FoVs, for the LH and RH displays at highway speeds. Many alternatives are possible such as using four sub-FoVs or another even number (e.g, 2, 6, 8, etc.) such that the center FoV is simply divided into left and right sides corresponding to right and left sub-FoVs of the two cameras, respectively, or three (or 5, 7, etc. cameras may be used with the middle camera providing the center FoV.

Figure 5:
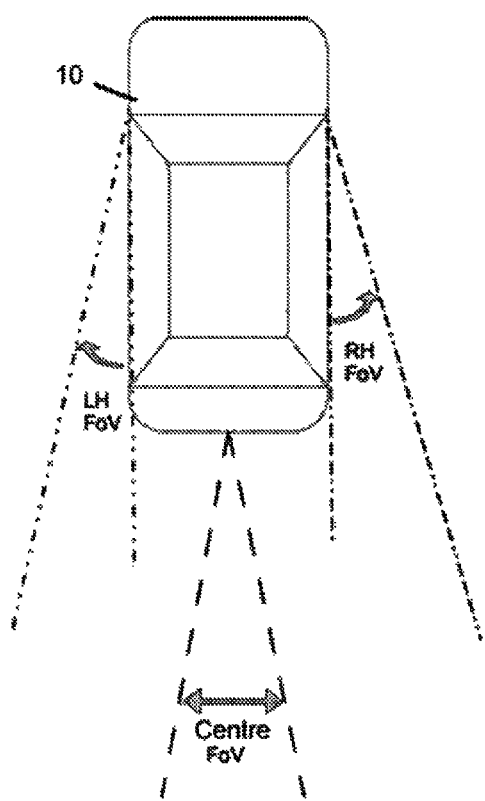

FIG. 5 illustrates another embodiment where one or more additional rearward facing cameras are incorporated at or near the wing-mirror locations. In the example illustrated at FIG. 5, two additional cameras are included. At higher forward speeds these cameras may be activated and their output fed to the LH and RH display screens of the display device 14s in place of the LH FoV and RH FoV from the WFoV camera at the rear of the vehicle. In certain embodiments, the views from these cameras could be combined with the LH FoV and RH FoV create composite displays for the LH and RH display screens. This eliminates potential blind-spots for another vehicle traveling directly to the side of our vehicle and thus outside the view of the WFoV rear camera.

Figure 6:
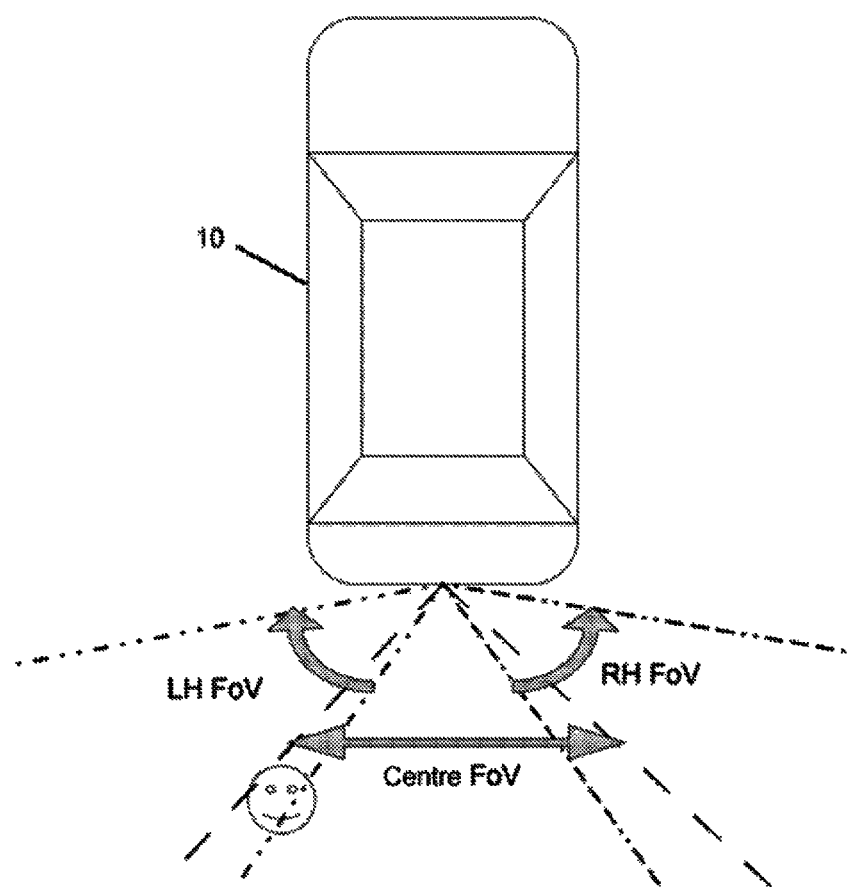

FIG. 6 illustrates certain embodiments where three video cameras (not shown) are located very close to one another at the center rear of the vehicle. The FoV of each camera provides a respective one of the three horizontal FoVs to be transmitted to the display device 14. Thus the FoV of the left hand camera provides the LH FoV, the FoV of the right hand camera provides the RH FoV, and the FoV of the middle camera provides the Centre FoV. Some overlap between LH and Center sub-FoVs and between Center and RH sub-FoVs is desirable to allow registration between these FoVs.

As will be appreciated, the present invention is implemented in a vehicle, where the stream of images provided by the cameras is to be processed and displayed reliably in real-time, with as rationalised a processor platform as possible.

The invention is not limited to the embodiments described herein which may be modified or varied without departing from the scope of the invention.

For example, suitable MEMS actuators for moving a lens or other optical component for auto-focus and/or zoom are described at U.S. patent application Ser. No. 61/622,480, and at US-PCT application no. PCT/US12/24018, and at US20110230013 and 20080157323, wherein each of these is incorporated by reference.

A conductive trace (see U.S. Ser. No. 13/571,393, e.g.) may also run in other embodiments partially along the sensor component or sensor component housing or the outside of the lens barrel or through the sensor housing, or sensor (e.g., using a thermal via or thru-silicon via or conductive via or copper via as in US20110230013 or 20080157323, which are incorporated by reference). The conductive trace may connect contact pads of an electronic actuator component to contact pads of a flexible printed circuit or printed circuit board in accordance with certain embodiments. Shock absorbing sponges or other elastic components may be disposed to shield interior camera module optics and electronics from shocks to an outer housing of the camera module, and an EMI shield and auto-focus and/or zoom features or accommodations may be provided, as may be described by examples in the Ser. No. 13/571,393 application which is incorporated by reference.

An accelerometer and/or an orientation sensor may be included in a camera module in accordance with certain embodiments, e.g., as may be described at U.S. Ser. Nos. 61/62,480 and/or 61/675,812, which are assigned to the same assignee and incorporated by reference.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein are incorporated by reference, as well as the background, abstract and brief description of the drawings, and U.S. application Ser. No. 12/213,472, Ser. No. 12/225,591, Ser. No. 12/289,339, Ser. No. 12/774,486, Ser. No. 13/026,936, Ser. No. 13/026,937, Ser. No. 13/036,938, Ser. No. 13/027,175, Ser. No. 13/027,203, Ser. No. 13/027,219, Ser. No. 13/051,233, Ser. No. 13/163,648, Ser. No. 13/264,251, and PCT application WO/2007/110097, and U.S. Pat. Nos. 6,873,358, and RE42,898 are each incorporated by reference into the detailed description of the embodiments as disclosing alternative embodiments.

Moreover, the following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, 7,317,815, and 7,289,278, and U.S. patent application Ser. No. 13/306,568, Ser. No. 13/282,458, Ser. No. 13/234,149, Ser. No. 13/234,146, Ser. No. 13/234,139, Ser. No. 13/220,612, Ser. No. 13/084,340, Ser. No. 13/078,971, Ser. No. 13/077,936, Ser. No. 13/077,891, Ser. No. 13/035,907, Ser. No. 13/028,203, Ser. No. 13/020,805, Ser. No. 12/959,320, Ser. No. 12/944,701 and Ser. No. 12/944,662; and United States published patent applications serial nos. US20120019614, US20120019613, US20120008002, US20110216156, US20110205381, US20120007942, US201110141227, US20110002506, US201110102553, U520100329582, US201110007174, US20100321537, US20110141226, US20100141787, US20110081052, US20100066822, US20100026831, US20090303343, US20090238419, US20100272363, US20090189998, US20090189997, US20090190803, US20090179999, US20090167893, US20090179998, US20080309769, US20080266419, US20080220750, US20080219517, US20090196466, US20090123063, VS20080112599, US20090080713, US20090080797, US20090080796, US20080219581, US20090115915, US20080309770, US20070296833 and US20070269108.

What is claimed is:

1. A rearview imaging system for a vehicle, comprising:
at least one video camera mounted on the vehicle for providing a wide angle horizontal field of view of a scene rearward of the vehicle,
a display device in the vehicle comprising a screen for viewing portions of the wide angle field of view by a driver of the vehicle, and
a video processor for subdividing the camera field of view into multiple horizontally disposed subsidiary fields of view and displaying said subsidiary fields of view on visually separated side-by-side regions of the display device screen, wherein:
during operation the system varies the extent of at least one subsidiary field of view as a function vehicle motion so that, during system operation, displayed portions of the camera wide angle field of view are divided into at least two subsidiary fields of view separated by a boundary and, while the vehicle is reversing and turning in a particular direction, when an image straddles the boundary between two subsidiary fields of view, the field of view angle of one or each of the subsidiary fields of view is adjusted to shift the angle of the scene subtended so that the image appears entirely within one of the subsidiary fields of view.

2. The system of claim 1, where the camera field of view is divided into left-hand, right hand and centre subsidiary fields of view.

3. The system of claim 2 wherein, also while the vehicle is reversing and turning in a particular direction, the centre field of view and the subsidiary field of view on the side of the vehicle in which the vehicle is reversing is shifted toward that side of the vehicle in which the vehicle is reversing.

4. The system of claim 3, wherein the region of the display screen displaying the centre field of view is elongated at the expense of at least one other region of the display screen.

5. The system of claim 4, wherein the angles of the subsidiary fields of view narrow when the vehicle moves forward.

6. The system of claim 5, where the susyem operates to render the subsidiary fields of view progressively narrower as the vehicle speed increases.

7. The system of claim 4, wherein the wide angle horizontal field of view of the video camera is at least 135 degrees.

8. The imaging system of claim 4, wherein the vertical field of view of the video camera is at least 70 degrees.

9. The system of claim 4, including multiple video cameras, wherein the wide angle horizontal field of view rearward of the vehicle is derived from two or more cameras.

10. The system of claim 3, wherein the subsidiary fields of view narrow when the vehicle moves forward.

11. An imaging system operational for a vehicle in forward or rearward motion, comprising:
at least one video camera mounted on the vehicle, operable to provide a wide angle horizontal field of view of a scene rearward of the vehicle subtending a field of view angle;
a display device in the vehicle for viewing portions of the wide angle field of view by a driver of the vehicle, and
a video processor for
(i) altering the field of view angle presented on the display device, relative to the camera field of view angle,
(ii) subdividing the camera field of view into multiple horizontally disposed subsidiary fields of view, and
(iii) displaying said subsidiary fields of view on visually separated side-by-side regions of the display device screen.

12. The rearview imaging system of claim 11, wherein the system provides a variable horizontal position or a variable subsidiary field of view on the display device.

13. The rearview imaging system of claim 11, wherein the system provides a variable subsidiary field of view on the display device as a function of the motion of the vehicle.

14. The rearview imaging system of claim 11, wherein the system narrows a field of view on the display device when the vehicle moves forward.

15. The rearview imaging system of claim 11, wherein the camera field of view is divided into at least two subsidiary fields of view separated by a boundary for presentation on the display device and, while the vehicle is reversing and turning in a particular direction, when an object straddles the boundary between two subsidiary fields of view, the field of view angle of one or each of the subsidiary fields of view is adjusted to shift the angle of the scene subtended so that the object appears entirely within one of the subsidiary fields of view.

16. The rearview imaging system of claim 11, wherein the angles of the subsidiary fields of view narrow when the vehicle moves forward.

* * * * *